(12) United States Patent
Tutt et al.

(10) Patent No.: US 6,482,769 B1
(45) Date of Patent: *Nov. 19, 2002

(54) DIFFUSION RESISTANT LENTICULAR ELEMENT

(75) Inventors: Lee W. Tutt, Webster, NY (US); Christine M. Vargas, Churchville, NY (US); Steven Evans, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 09/712,424

(22) Filed: Nov. 14, 2000

Related U.S. Application Data

(62) Division of application No. 09/404,564, filed on Sep. 23, 1999, now Pat. No. 6,208,364.

(51) Int. Cl.$^7$ .......................... B41M 5/035; B41M 5/38
(52) U.S. Cl. ................ 503/227; 430/945; 430/946
(58) Field of Search .................. 8/471; 503/227; 430/945, 946

(56) References Cited

U.S. PATENT DOCUMENTS

| | | | |
|---|---|---|---|
| 3,769,023 A | 10/1973 | Lewis et al. | 430/282.1 |
| 5,126,760 A | 6/1992 | DeBoer | 347/232 |
| 5,168,094 A | 12/1992 | Shuttleworth et al. | 503/227 |
| 5,177,052 A | 1/1993 | Ambro et al. | 503/227 |
| 5,838,360 A | 11/1998 | Harrold et al. | 347/258 |
| 5,932,517 A | 8/1999 | Wen et al. | 503/227 |
| 6,221,806 B1 * | 4/2001 | Tutt et al. | 503/201 |
| 6,239,068 B1 * | 5/2001 | Tutt et al. | 503/201 |

* cited by examiner

Primary Examiner—Bruce H. Hess
(74) Attorney, Agent, or Firm—Harold E. Cole

(57) ABSTRACT

A diffusion resistant lenticular element comprising a support having a lenticular array thereon, the element having thereon an acidic mordanting layer containing a laser-induced, cationic dye image, the mordanting layer being on the side of said support which does not contain said lenticular array.

Another embodiment of the invention relates to a process of forming a diffusion resistant lenticular element comprising:

a) contacting at least one dye-donor element comprising a support having thereon a dye layer comprising an image dye in a binder having an infrared-absorbing material associated therewith, said image dye comprising a nonionic dye capable of being converted to a cationic dye by means of an acid, with a lenticular element comprising a support having a lenticular array thereon on the opposite side thereof;

b) imagewise-heating the dye-donor element by means of a laser;

c) transferring a dye image to the support of the lenticular element;

d) contacting the dye image with an acidic mordanting layer; and e) heating the element to cause the nonionic dye to convert to a cationic dye which is mordanted in the acidic mordanting layer.

6 Claims, No Drawings

DIFFUSION RESISTANT LENTICULAR ELEMENT

CROSS REFERENCE TO RELATED APPLICATIONS

This is a Divisional of application Ser. No. 09/404,564, filed Sep. 23, 1999, now U.S. Pat. No. 6,208,364.

Reference is made to commonly-assigned copending U.S. patent application Ser No. 09/404,093, filed of even date herewith, entitled "Process for Obtaining a Diffusion Resistant Lenticular Element", of Tutt et al; and copending U.S. patent application Ser. No. 09/404,062, filed of even date herewith, entitled "Diffusion Resistant Lenticular Element", of Tutt et al; the teachings of which are incorporated herein by reference.

FIELD OF THE INVENTION

This invention relates to the laser printing of stereoscopic, multiple images or motion images which will be used in conjunction with a lenticular element.

BACKGROUND OF THE INVENTION

Lenticular arrays or overlays are a known means to give images the appearance of depth or motion. A lenticular image is created using a transparent upper layer having narrow parallel lenticules (half cylindrical lenses) on the outer surface and an image containing substrate or lower layer which projects images through the lenticules. The two layers form a lenticular system wherein each image is selectively visible as a function of the angle from which the system is viewed. A depth image is a composite picture made by bringing together into a single composition a number of different parts of a scene viewed from different angles. When the lenticules are vertically oriented, each eye of a viewer will see different elements and the viewer will interpret the net result as depth of field. The viewer may also move his head with respect to the image thereby observing other views with each eye and enhancing the sense of depth. Each lenticule is associated with a plurality of image lines or an image line set and the viewer is supposed to see only one image line (or view slice) of each set with each eye for each lenticule. It is imperative that the line image sets be registered accurately with the lenticules, so that the proper picture is formed when the assembly is viewed.

This process can be used to generate a three-dimensional effect at a proper viewing distance or multiple images by viewing from different angles. When the lenticules are oriented horizontally, each eye receives the same image. In this case, the multiple images upon moving the lenticular can be used to generate the illusion of motion. For whichever orientation the lenticules are oriented, each of the viewed images is generated by lines from an image which has been interlaced substantially at the frequency of the lenticular array, number of lenticules per length and with the desired number of images.

One method of recording of linear images on a lenticular recording material is accomplished with a stereoscopic image recording apparatus (hereunder referred to simply as "a recording apparatus") that relies upon optical exposure (printing). With this recording apparatus, original transmission images are projected from a light source. The light transmitted through the original images passes through the projection lenses of the recording apparatus to be focused on the lenticular recording material via a lenticular sheet. The original images are thereby exposed as linear images.

Another method of image recording uses scanning exposure which requires comparatively simple optics and yet has great flexibility in adapting to various image-processing operations and to alterations in the specifications of the lenticular sheet.

In the article entitled "Development of Motion Image Printer", by H. Akahori et al., IS&T 50th Annual Conference Proceedings, page 305, there is a disclosure of a printer for printing stereoscopic images using a thermal head and thermal dye transfer in registration with the lenticular material. The receiver sheet must be heated to achieve the necessary stability for registration of the images with the lenticular material. The resolution is six images on 100 DPI lenticular material with a 300 DPI thermal head. However, there is a problem with this method in that low resolution images are obtained, since heat transferred from the resistive head "spreads" through the support during printing.

EP 0 596 629A2 and EP 0 659 026A2 disclose a method and apparatus for directly printing on lenticular supports using lasers. This method generates an image in contact with the lenticular material. There is a problem with this method, however, in that the dyes can continue to migrate after transfer, resulting in unacceptable image ghosting (adjacent views bleeding through).

An object of this invention is to generate high resolution lenticular images which are resistant to thermal dye diffusion. It is another object of this invention to generate images efficiently with high abrasion resistance.

SUMMARY OF THE INVENTION

These and other objects are achieved in accordance with this invention which relates to a diffusion resistant lenticular element comprising a support having a lenticular array thereon, the element having thereon an acidic mordanting layer containing a laser-induced, cationic dye image, the mordanting layer being on the side of the support which does not contain the lenticular array.

Another embodiment of the invention relates to a process of forming a diffusion resistant lenticular element comprising:

a) contacting at least one dye-donor element comprising a support having thereon a dye layer comprising an image dye in a binder having an infrared-absorbing material associated therewith, the image dye comprising a nonionic dye capable of being converted to a cationic dye by means of an acid, with a lenticular element comprising a support having a lenticular array thereon on the opposite side thereof;

b) imagewise-heating the dye-donor element by means of a laser;

c) transferring a dye image to the support of the lenticular element;

d) contacting the dye image with an acidic mordanting layer; and e) heating the element to cause the nonionic dye to convert to a cationic dye which is mordanted in the acidic mordanting layer.

By use of the invention, a high resolution lenticular image is generated efficiently which is resistant to thermal dye diffusion and has a high abrasion resistance.

DESCRIPTION OF THE PREFERRED EMBODIMENTS

As noted above, dyes useful in the invention are nonionic dyes capable of being converted to cationic dyes by means of an acid. A cationic dye diffuses much less readily than a nonionic dye due to electrostatic forces retarding movement. An example of an nonionic dye which converts to a cationic dye in the presence of an acid is the following (Since the chromophore is involved in the reaction, there is a color change indicating the state of the dye molecule):

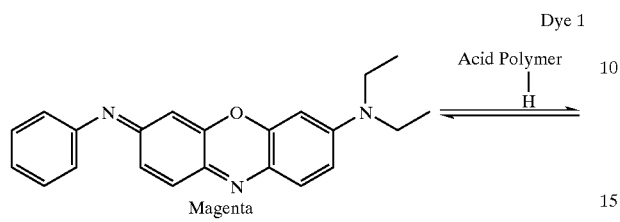

Dye 1

Magenta

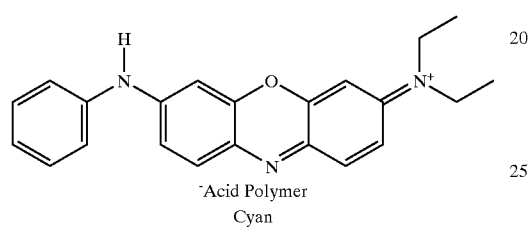

Dye 2 (Cyan, Acid Polymer)

Examples of such dyes which may be used in the invention are of many classes. For example, the dye may be a deprotonated cationic dye which is capable of being reprotonated to a cationic dye having an N—H group which is part of a conjugated system. Additional examples of such dyes are disclosed in U.S. Pat. No. 5,523,274, the disclosure of which is hereby incorporated by reference, and include the following:

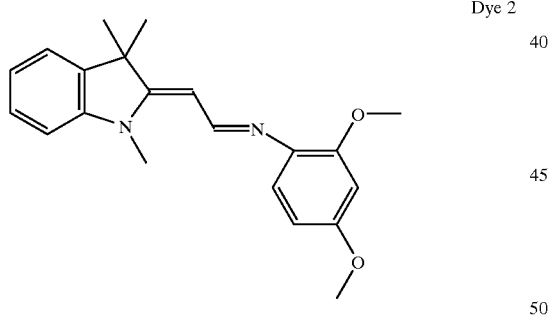

Dye 2

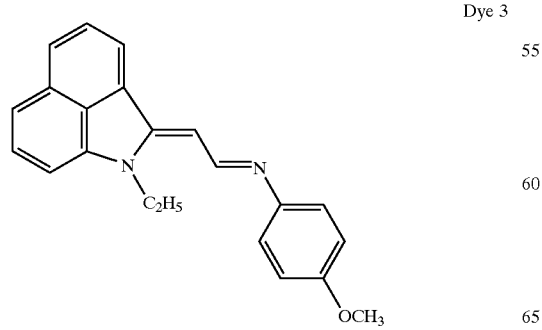

Dye 3

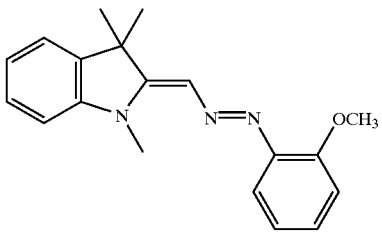

Dye 4

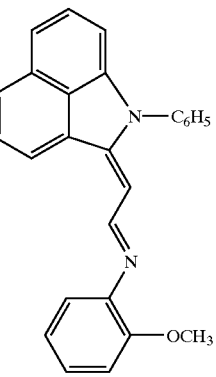

Dye 5

Another class of dyes useful in the invention is a pendant basic dye capable of being protonated to a cationic dye, as disclosed in U.S. Pat. Nos. 5,512,532, 5,744,422, and 5,804,531, the disclosures of which are hereby incorporated by reference. An example of a pendant basic dye which converts to a cationic dye in the presence of an acid is the following:

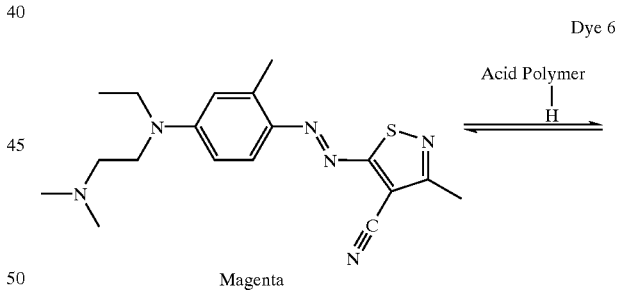

Dye 6

Magenta

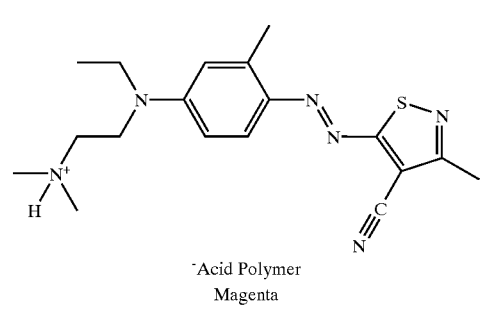

Magenta (Acid Polymer)

Additional examples of such dyes include the following:

Dye 7

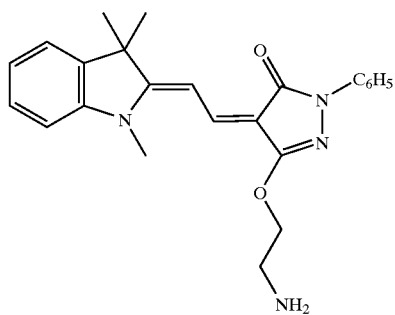

Dye 8

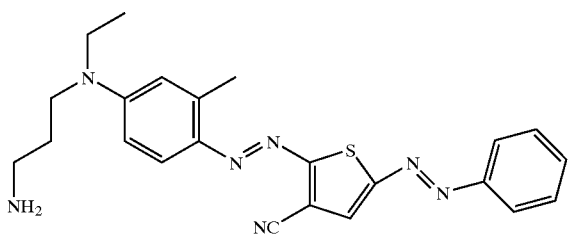

Another class of dyes useful in the invention is a lactone leuco dye capable of being protonated to a cationic dye, as disclosed in U.S. Pat. No. 5,830,823 and copending U.S. Ser. No. 08/996,388, the disclosures of which are hereby incorporated by reference. An example of a lactone leuco dye which converts to a cationic dye in the presence of an acid is the following:

Dye 9

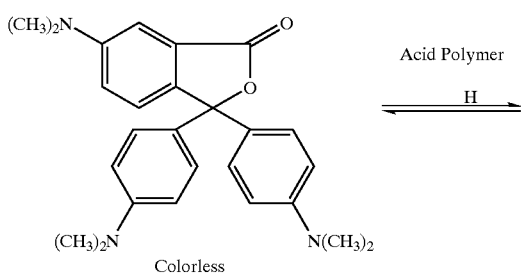

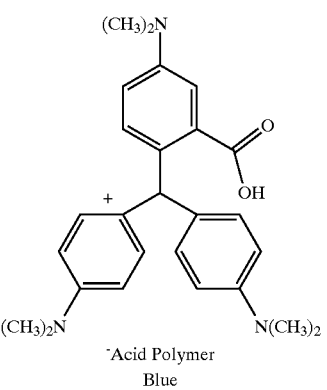

An additional example of such dyes includes the following:

Dye 10

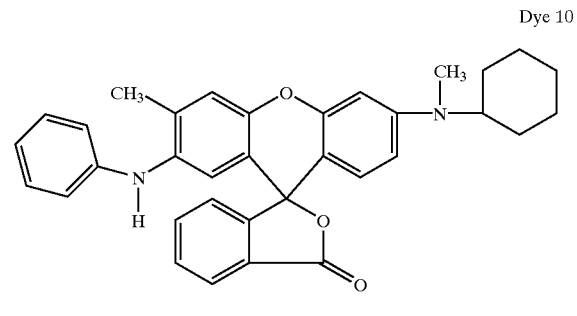

Another class of dyes useful in the invention is a carbinol dye capable of being protonated to a cationic dye, as disclosed in U.S. Pat. No. 5,804,531, the disclosure of which is hereby incorporated by reference. An example of a carbinol dye which converts to a cationic dye in the presence of an acid is the following:

Dye 11

The mordanting layer useful in the invention is acidic, which may be the result of adding an acid to a polymer or using an acidic polymer. In a preferred embodiment of the invention, an acidic polymer is used such as described in U.S. Pat. No. 5,523,274, the disclosure of which is hereby incorporated by reference. Examples of such polymers include condensation polymers such as polyesters, polyurethanes, polycarbonates, etc.; addition polymers such as polystyrenes, vinyl polymers, etc.; block copolymers containing large segments of more than one type of polymer covalently linked together; provided such polymeric material contains acid groups as part of the polymer chain. In a preferred embodiment of the invention, the mordanting layer comprises an acrylic polymer, a styrene polymer or a phenolic resin.

The dyes of the dye-donor element used in the invention can optionally be dispersed in a polymeric binder such as a cellulose derivative, e.g., cellulose acetate hydrogen phthalate, cellulose acetate, cellulose acetate propionate, cellulose acetate butyrate, cellulose triacetate or any of the materials described in U.S. Pat. No. 4,700,207; polyvinyl butyrate; copolymers of maleic anhydride with vinyl ethers such as methyl vinyl ether; polycyanoacrylates; a polycarbonate;

poly(vinyl acetate); poly(styrene-co-acrylonitrile); a polysulfone or a poly(phenylene oxide), gelatin, etc. The binder may be used at a coverage of from about 0.1 to about 5 g/m².

Any material can be used as the support for the lenticular array of the invention provided it is dimensionally stable. Such materials include polyesters such as poly(ethylene terephthalate); polyamides; polycarbonates; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide-amides and polyetherimides. The support generally has a thickness of from about 50 to about 5000 μm. While the lenticular array may be provided on a separate support, generally the support and the array are in one integral element.

Infrared-absorbing materials which may be used in the invention include carbon black, cyanine infrared-absorbing dyes as described in U.S. Pat. No. 4,973,572, or other materials as described in the following U.S. Pat. Nos. 4,948,777; 4,950,640; 4,950,639; 4,948,776; 4,948,778; 4,942,141; 4,952,552; 5,036,040; and 4,912,083, the disclosures of which are hereby incorporated by reference.

A laser is used to transfer dye from the dye-donor element used in the invention. It is preferred to use a diode laser since it offers substantial advantages in terms of its small size, low cost, stability, reliability, ruggedness, and ease of modulation.

Lasers which can be used to transfer dye from dye-donors employed in the invention are available commercially. There can be employed, for example, Laser Model SDL-2420-H2 from Spectra Diode Labs, or Laser Model SLD 304 V/W from Sony Corp.

A thermal printer which uses the laser described above to form an image on a thermal print medium is described and claimed in U.S. Pat. No. 5,268,708, the disclosure of which is hereby incorporated by reference.

Spacer beads may be employed in a separate layer over the dye layer of the dye-donor element in the above-described laser process in order to separate the donor from the receiver during dye transfer, thereby increasing the uniformity and density of the transferred image. That invention is more fully described in U.S. Pat. No. 4,772,582, the disclosure of which is hereby incorporated by reference. Alternatively, spacer beads may be employed in the receiving layer of the receiver as described in U.S. Pat. No. 4,876,235, the disclosure of which is hereby incorporated by reference. The spacer beads may be coated with a polymeric binder if desired.

As noted above, in the process of the invention, the lenticular element with the transferred dye is heated to cause the nonionic dye to convert to a cationic dye which is mordanted in the adhesive layer. This heating may be accomplished, for example bypassing the element between a pair of heated rollers. Other methods of heating could also be used such as using a heated platen, use of pressure and heat, external heating, etc. Mechanical adhesion may be used to maintain registration after heating and mordanting if sufficient adhesion does not occur between the acidic mordanting layer and the lenticular array element. The mechanical adhesion, for example, can be in the form of clamps, registration pins or a frame.

The following examples are provided to illustrate the invention.

EXAMPLES

Example 1

The following control dyes were employed which contain dialkylarylamines and quinone imines which are not readily protonated except under extreme acidic conditions:

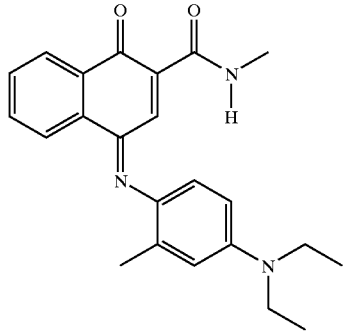

Control Dye 1

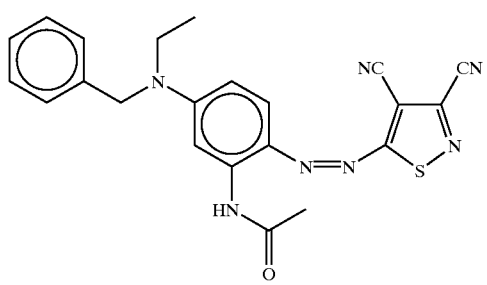

Control Dye 2

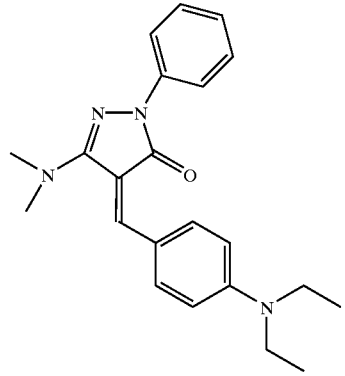

Control Dye 3

Control Dye Donor Element 1

The donor element was coated with a laydown of 0.22 g/m² carbon black, Cabot Black Pearls 700® (Cabot Corp.), 0.54 g/m² polyvinylbutyral, (Butvar® 76, Monsanto Co.), 0.01 g/m² Fluorad FC 431® surfactant (3M Co.), 0.02 g/m² crosslinked polydivinylbenzene beads, 5.4 μm, and 0.54 g/m² of Control Dye 1 from methyl isobutyl ketone on a 104 μm thick poly(ethylene terephthalate) support.

Control Dye Donor Elements 2–3

These donor elements were prepared the same as Control Dye Donor Element 1 except that Control Dye 2 and Control Dye 3 were used instead of Control Dye 1.

Elements 1–11 Used In The Invention

These donor elements were prepared the same as Control Dye Donor Element 1 except that Dyes 1–11 were used instead of Control Dye 1.

Polymeric Acidic Mordanting Layer Used In The Invention

A 0.31 mm cast film of the ammonia salt of poly{isophthalic acid-co-5-sulfoisophthalic acid (90:10 molar ratio)-diethylene glycol (100 molar ratio)}, MW=20,000 (ammonium salt of AQ29D, Eastman Chemical Co.) and 0.02 g/m² Dispex N-40® surfactant (Ciba Specialty Chemicals) was used.

Protective Support with Acidic Polymeric Mordanting Layer

A 36 μm thick poly(ethylene terephthalate) support was coated with an aqueous coating of 3.22 g/m² of the ammonia salt of poly{isophthalic acid-co-5-sulfoisophthalic acid (90:10 molar ratio)-diethylene glycol (100 molar ratio)}, MW=20,000 (ammonium salt of AQ29D, Eastman Chemical Co.) and 0.02 g/m² Dispex N-40® surfactant (Ciba Specialty Chemicals).

Lenticular Array

A polycarbonate lenticular material which consisted of cylindrical lenses on one face and a flat rear face was used. This lenticular material had a pitch of 1.973 lines/mm and a thickness of 1.27 mm. The lens curvature was such that focus was on the rear of the lenticular material.

Printing

A dye-donor element was placed dye side to flat rear side of the lenticular array and vacuum was applied to hold the donor to the array. Printing was accomplished using an SDL 23-S9781 1 watt c-mount laser diode (Spectra Diode Labs, Inc.). Approximately 700 mw was delivered to the element in a spot approximately 13 μm by 80 μm using the technique of beam folding as disclosed in copending application U.S. Ser. No. 09/175,735 of Kessler, filed Oct. 20, 1998. Scanning of the spot was accomplished using a galvanometer with the beam oriented with the long axis parallel to the scan direction as described in the copending application U.S. Ser. No. 09/128,077, of Kessler et al., filed Aug. 3, 1998. Dwell time was approximately 9 microseconds, except for dyes 8–11 which were at 19 microseconds.

A target image consisting of lines spaced at multiples of 11 μm was written on to the back of the donor causing the donor dye to be transferred to the lenticular material. Thus, lines are spaced at 11, 21, 32 and 42 μm, creating gaps between adjacent lines. The lines were written such that the donor lines were parallel to the lenticules. This spacing was such that the proper viewing of a flat field image was about 30 cm. By holding the card at another distance, either nearer or farther; the individual lines and spacings could be observed via a Moiré effect.

Mordanting of the dyes and lamination of the acidic mordanting layer with and without a protective support was accomplished by passing the lenticular element and the acidic mordanting layer through a laminator with the acidic mordanting layer in contact with the flat side of the lenticular array. The acidic mordanting layer without a protective support was laminated against Teflon®. The lamination was conducted with a feed rate of 0.36 cm/sec at a temperature of 133° C. The laminator was a modified GMP Co. LTD (Kyoungki-Do, Korea) laminator model Passport-175LSI. The modification was to adjust the gap thickness to accommodate the 1270 μm lenticular material.

The color of the printed lines was observed before and after lamination and are recorded in Table 1 below. Some of the dyes change color since protonation alters the chromophore. This is an indication that mordanting has taken place in those classes of dyes. Pendent amine Dyes 5–7 are examples of protonation taking place in the pendent group, and not in the chromophore.

The 36 μm poly(ethylene terephthalate) protective support provides excellent abrasion resistance. Scraping with a paper clip afforded no dye movement or scratching of the dye image.

All spacings between written lines could be clearly seen after lamination in all lenticular images generated from the different donor elements prior to thermal keeping. For a thermal keeping test, the laminated cards were placed in an oven at 160° F. for 6 hours and the spacings between lines observed as discussed previously. For a high resolution lenticular element, the gaps should not be filled in. Modulation is a measure of how much the gaps are filled in. A strong modulation is an indication of little thermal dye diffusion. Weak modulation indicates significant thermal dye diffusion filling in a gap and is undesirable.

A gap of 11 μm between written lines is designated a one line spacing. A gap of 22 μm between written lines is designated a two line spacing. A gap of 33 μm between written lines is designated a three line spacing. The following diffusion number rating system was employed (lower numbers are desirable since this is an indication of the gap not be filled in due to increased thermal dye diffusion stability):

Diffusion Number Rating

1 Strong modulation of 1 line spacing (11 μm)

2 Weak modulation of 1 line spacing

3 No modulation of 1 line spacing, strong modulation of 2 line spacing (21 μm)

4 Weak modulation of 2 line spacing

5 No modulation of 2 line spacing, strong modulation of 3 line spacing (32 μm)

6 Weak modulation of 3 line spacing

7 No modulation of 3 line spacing, modulation of 4 line spacing (42 μm)

The following results were obtained:

TABLE

| Element Containing Dye | Lamination With Protective Support | Diffusion Number | | Color | |
| --- | --- | --- | --- | --- | --- |
| | | Before Heating | After Heating | Before Lamination | After Lamination |
| Control 1 | Yes | 1 | 5 | Cyan | Cyan |
| Control 2 | Yes | 1 | 7 | Magenta | Magenta |
| Control 3 | Yes | 1 | 6 | Yellow | Yellow |
| 1 | Yes | 1 | 3 | Magenta | Cyan |
| 2 | Yes | 1 | 3 | V. Pale Yellow | Yellow |
| 3 | Yes | 1 | 3 | Orange | Magenta |
| 4 | Yes | 1 | 3 | Yellow | Orange |
| 5 | Yes | 1 | 3 | Cyan | Cyan |
| 6 | Yes | 1 | 2 | Magenta | Magenta |
| 6 | No | 1 | 3 | Magenta | Magenta |
| 7 | Yes | 1 | 1 | Yellow | Yellow |

TABLE-continued

| Element Containing Dye | Lamination With Protective Support | Diffusion Number | | Color | |
|---|---|---|---|---|---|
| | | Before Heating | After Heating | Before Lamination | After Lamination |
| 8 | Yes | 1 | 3 | Colorless | Black |
| 9 | Yes | 1 | 1 | Colorless | Blue |
| 10 | Yes | 1 | 1 | Orange | Magenta |
| 11 | Yes | 1 | 1 | Pale Yellow | Yellow |

The above results show that the dyes used in the invention had a lower mobility than the control dyes as evidenced by having a lower diffusion number.

The invention has been described in detail with particular reference to preferred embodiments thereof, but it will be understood that variations and modifications can be effected within the spirit and scope of the invention.

What is claimed is:

1. A diffusion resistant lenticular element comprising a support having a lenticular array thereon, said element having thereon an acidic mordanting layer containing a laser-induced, cationic dye image, said mordanting layer being on the side of said support which does not contain said lenticular array.

2. The element of claim 1 wherein said mordanting layer comprises an acidic polymer.

3. The element of claim 1 wherein said cationic dye is a protonated cationic dye having a N—H group which is part of a conjugated system.

4. The element of claim 1 wherein said cationic dye is a protonated pendant basic dye.

5. The element of claim 1 wherein said cationic dye is a protonated lactone leuco dye.

6. The element of claim 1 wherein said cationic dye is a protonated carbinol dye.

* * * * *